UNITED STATES PATENT OFFICE.

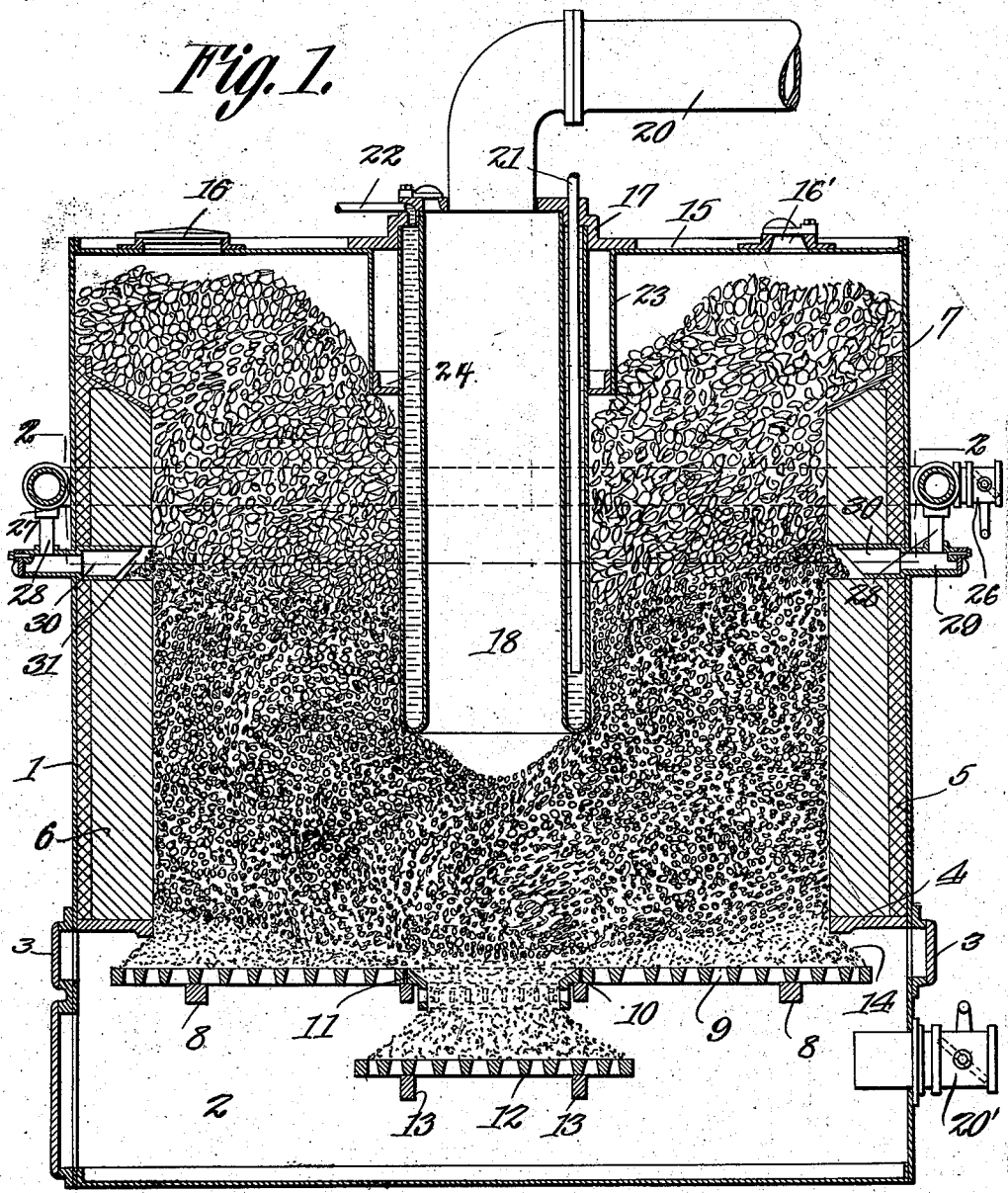

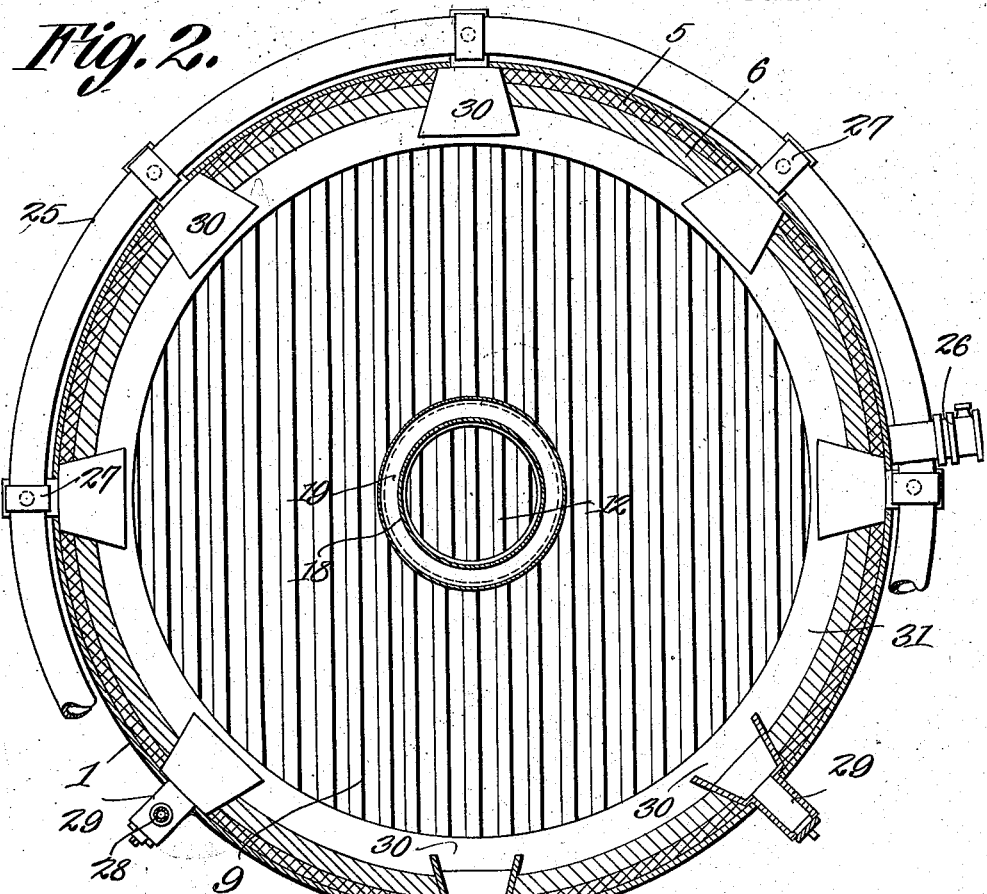
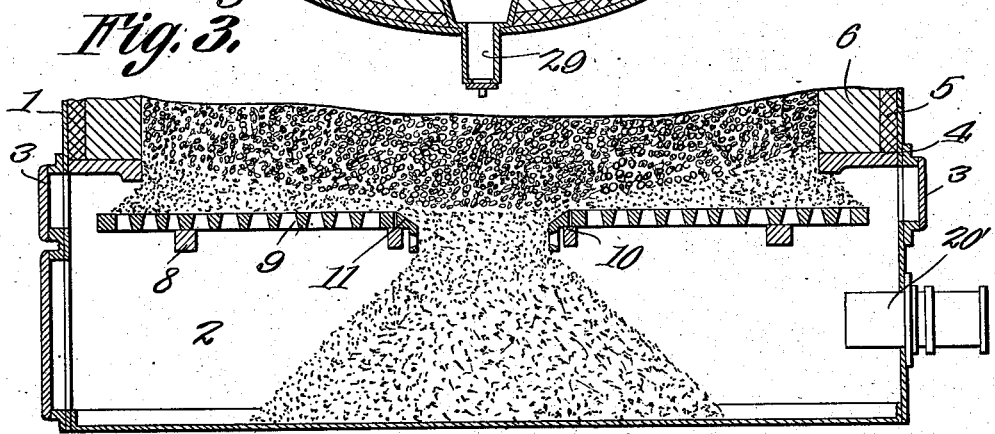

PETER G. SCHMIDT, OF OLYMPIA, WASHINGTON.

GAS-PRODUCER.

1,142,633. Specification of Letters Patent. Patented June 8, 1915.

Application filed February 17, 1913, Serial No. 749,039. Renewed May 6, 1915. Serial No. 26,425.

*To all whom it may concern:*

Be it known that I, PETER G. SCHMIDT, a citizen of the United States, residing at Olympia, in the county of Thurston and State of Washington, have invented a new and useful Gas-Producer, of which the following is a specification.

The present invention relates to improvements in gas producers, one object of the present invention being the provision of a means, whereby the zone of incandescence is maintained at a point considerably above the inlet end of a centrally disposed gas collector, this zone being maintained by the introduction of currents of air led from the peripheral wall of the casing or combustion chamber, for the purpose of causing combustion and the incandescent zone to extend around and above the inlet end of the gas collector, thereby causing volatile distillates from the fuel in the upper magazine zone of the fuel bed to pass through said incandescent zone and become fixed gases.

A further object of the present invention is the provision of a gas producer, in which a flat grate is provided having a central opening for the discharge of ash and clinkers at a point directly below the inlet end of the gas collector, thus permitting the ready removal of any clinkers that may form at such point.

In producing gas with the usual form of concentrically or centrally disposed gas collector or twyer, it has been possible only under most favorable conditions to produce a reasonably clean gas and only when the producer is operated with extreme care. I have found that at a point directly below the inlet end of the gas collector the greatest ash and clinker formation takes place and the removal of clinkers from the usual grate causes the fuel in the state of incandescence there around, to be too greatly disturbed. By my grate construction I however eliminate these operating difficulties and am able to project the inlet end of my gas collector far enough down into the incandescent zone to assure the delivery of a cleaner gas to and through the collector. I am able to maintain my collector within 27 to 30 inches from the grate. By further providing my producer with a means for introducing air adjacent to the wall of the producer above the inlet end of the collector and below the upper surface of fuel in the producer, I find that the zone of incandescence can be easily controlled and limited to a point approximately upon a line with the introduction of the air, thus causing the air to radiate downwardly and centrally through the incandescent fuel toward the inlet end of the collector thereby causing combustion and fixation of the volatiles of the fuel and delivering a very clean gas.

With the relation existing between the inlet of the collector, the grate and the upper air inlets, in practical operation, I have proven, that all wall channeling, consequent wall clinkering and destruction of producer lining, is entirely eliminated, because the action of the combustion is all toward the centrally disposed inlet of the gas collector. This also avoids the possible collection of an explosive mixture in the top of the producer. Another of the advantages of introducing the upper air at the wall of the producer and below the surface of the fuel instead of above the surface of the fuel, is to eliminate the channeling along the collector wall that would thus ensue.

With the foregoing and other objects in view which would appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a vertical transverse sectional view through a complete gas producer constructed according to and embodying the present invention. Fig. 2 is a section taken on line 2—2 of Fig. 1. Fig. 3 is a sectional view showing a modified form or grate used in connection with the producer.

Referring to the drawings, the numeral 1 designates the usual casing, having the ash pit 2, the slicing doors 3, and the supporting flange 4, for the heat resisting and refractory linings 5 and 6 respectively. A cap ring 7 is disposed upon the upper end of the linings, as clearly shown.

Mounted in the lower part of the casing below the rim 4 are the grate supports 8, which carry the flat grate 9, which is a sectional grate and of a shaking type. The grate 9 is provided with the supporting concentrically disposed rim 10, which carries the concentrically disposed discharge ring 11, which as clearly illustrated is above the lower and auxiliary grate 12, which is supported upon the support 13 for shaking.

Although no detailed mechanism is shown for shaking the grates 9 and 12, the various bars thereof are to be constructed so that a slight shaking action may be imparted for causing the precipitation of the ash within the ash pit 2.

The grate 9 is so disposed as to provide the annular space 14 between it and the rim 4 so that a slicing bar may be introduced through the slicing apertures 3 to remove the clinkers through the outlet 14 into the ash pit.

The dome or cover 15 of the producer is constructed similarly to the two zone producers, being provided with the fuel introducing doors 16 and the poker introducing hole 16', said hole 16' being disposed so that a poker may be introduced vertically downward through the mass to a point adjacent the grate 9 and be moved radially toward the center of the mass or as to break up any clinkers that may be within the incandescent zone above the grate and the lower inlet end of the gas collector or twyer 18 which is properly supported from its upper end by the supporting ring 17 concentrically of the cover 15 and into the mass of fuel within the producer. A conduit 20 is connected to the ring 17 and is in communciation with the gas collector 18 at the upper end thereof, there being created as usual a suction therethrough and consequently through the inlet air directing conduit 20'.

The collector 18 is water jacketed as at 19 and is provided with the water introducing pipe 21 and the outlet 22. A ring 24 is carried by the sleeve 23 from the dome 15 of the producer at a point concentrically about the upper end of the collector 18.

In order to provide a means for introducing air peripherally of the combustion chamber at a point above the lower inlet end of the collector 18, an air introducing conduit 25 is disposed concentrically about the casing 1, and has led thereinto the valve controlled inlet 26, a plurality of T-couplings 27 having the vertical nipples 28, being connected to the air introducing conduits 29, which are fitted within the casing and have their nozzles 30 introduced within the annular space 31 formed in the refractory lining 6 peripherally of the combustion chamber. The outlet ends of the respective nozzles 30 are disposed as clearly shown in Fig. 1, at a point above the inlet end of the collector 18, so that the attendant suction through the collector 18 will draw the air inclinedly downward through the incandescent mass, thus limiting the zone of incandescence to a point slightly above the inlet end of the collector 18, so that the green material in the upper end of the producer will have the volatile gases and objectionable carbonaceous material drawn therefrom and downwardly into the incandescent zone to be burned before it is possible for the same to enter the inlet end of the collector in the form of a gas.

By introducing the air through the respective nozzles 30 at the point indicated, the same combines with the inrushing air through the grate to insure an even zone of incandescence from the center of the combustion chamber to the lining 6, and yet without forming a crust upon such lining and the outer face of the inlet end of the collector 18, it having been found that the material in the incandescent zone is maintained at an even incandescence from the ash line of the grate 9, to a point above the inlet end of the collector 18.

In the form of apparatus shown in Fig. 3, the grate 12 and its support 13 are dispensed with, the discharge from the outlet ring 11 being directly into the ash pit 2, the structure therein shown providing a means to assist in the removal of any clinker that may form below the inlet end of the collector 18 and also a structure whereby when so formed may be readily removed without the pushing or pulling thereof through the annular outlet 14, as is the usual practice.

It is also apparent that although a cylindrical producer has been herein shown, the same may be square, or any form, it being essential, however, that the collector or twyer 18 be disposed in the center and vertically above the grate 9 with the upper air introducing means disposed in the wall and opening toward the center, such openings being above the inlet end of the collector or twyer.

The air entering the nozzles 30 and conduit 20' may be humidified to produce the desired and necessary quality of gas, or even when desired, to produce a hydrogen gas, as the greater amount of humidity carried by the air into the incandescent zone, will cause the complete combustion of carbon so that hydrogen is given off and passes into and through the collector 18.

By introducing air by the conduit 20', the ash pit can be cleaned out and if necessary the material upon the grate 9 agitated by introducing a poker or slicing bar through the ash pit doors, without interfering with the feed of air through the grate 9.

From the foregoing description, taken in connection with the drawings it is evident that by constructing a gas producer as heretofore described, that the difficulties found in the usual two zone producer or the producer, in which a current of air is drawn from the extreme upper end of the casing, are entirely overcome, and that an incandescent zone will be maintained of substantially the same area at all times whether the producer is running below or above its normal capacity.

What I claim as new is:

1. A gas producer, including a casing, an axially disposed depending gas collector supported from and having its outlet through the top of the casing, means for supplying air to the casing from below the inlet end of the gas collector, and means for supplying air radially into the casing in a plane above, around and toward the inlet end of the gas collector and below the top surface of the fuel body.

2. A gas producer, including a casing, a top therefor, an axially disposed gas collector carried by and depending from the top into the casing, the lower end being the inlet end and being disposed to be projected within the body of the fuel, means for supplying air to the casing at a plane below the inlet end of the gas collector, and a second air supplying means disposed in the wall of the casing about the gas collector and in a plane above the inlet end of the gas collector and below the top of the fuel body, whereby air is directed radially from the wall of the casing toward the collector.

3. A gas producer, including a casing, a top therefor, an axially disposed gas collector carried by the top and projected into the casing, means for supplying air to the casing from below the inlet end of the gas collector, and means for supplying air through the wall of the casing at points around the gas collector and in a plane above the inlet end of the gas collector and below the top surface of the fuel body, said latter means including an air directing recess formed in the wall of the casing, and a plurality of radially disposed air directing nozzles mounted in spaced relation and within said recess and opening toward the collector.

4. A gas producer, including a casing, a top therefor, an axially disposed gas collector carried by the top and projected into the casing, means for supplying air to the casing from below the inlet end of the gas collector, and means for supplying air through the wall of the casing at points around the gas collector and in a plane above the inlet end of the gas collector and below the top surface of the fuel body, said latter air directing means including an annular air conducting member exteriorly of the casing, and a plurality of nozzles mounted in the wall of the casing and all outletting toward the gas collector, said nozzles being in communication with the annular conducting member.

In testimony that I claim the foregoing as my own, I have hereto affixed my signature in the presence of two witnesses.

PETER G. SCHMIDT.

Witnesses:
SELINA WILLSON,
I. E. SIMPSON.

Copies of this patent may be obtained for five cents each, by addressing the "Commissioner of Patents, Washington, D. C."